Oct. 30, 1928.

1,689,365

A. C. SCHMOHL ET AL

DUMP CAR BODY TILTING BEARING

Filed July 25, 1927     2 Sheets-Sheet 1

WITNESS    INVENTOR

Oct. 30, 1928.  
A. C. SCHMOHL ET AL  
1,689,365  
DUMP CAR BODY TILTING BEARING  
Filed July 25, 1927   2 Sheets-Sheet 2

Patented Oct. 30, 1928.

1,689,365

UNITED STATES PATENT OFFICE.

ALFRED C. SCHMOHL, OF BEAVER FALLS, AND JOHN P. ANDERSON, OF KOPPEL, PENN-SYLVANIA, ASSIGNORS TO KOPPEL INDUSTRIAL CAR AND EQUIPMENT COMPANY, OF PITTSBURGH, PENNSYLVANIA, A CORPORATION OF PENNSYLVANIA.

DUMP-CAR-BODY-TILTING BEARING.

Application filed July 25, 1927. Serial No. 208,174.

An object of the invention is to provide a dump car having the center of gravity of the body as low as possible, and yet be able to throw the body outward, in dumping, a sufficient amount to obtain the greatest possible discharge angle.

Another object of the invention is to provide a tilting bearing support for a dump car body which will enable the body to discharge its contents quickly and away from the car tracks.

Another object of the invention is to provide a dump car body with a tilting bearing support composed of two members having three points of possible contact and a connecting link between the members to retain said members in connected relation in all positions.

Another object of the invention is to provide a dump car body with body eccentric bearings which will facilitate the return of the tilted car body to a horizontal position after discharge of the contents.

A further object of our invention is to provide a dump car having a low center of gravity with a body tilting bearing, which will allow a greater tilting angle than heretofore possible, and yet discharge the material clear of the tracks.

Figure 1:
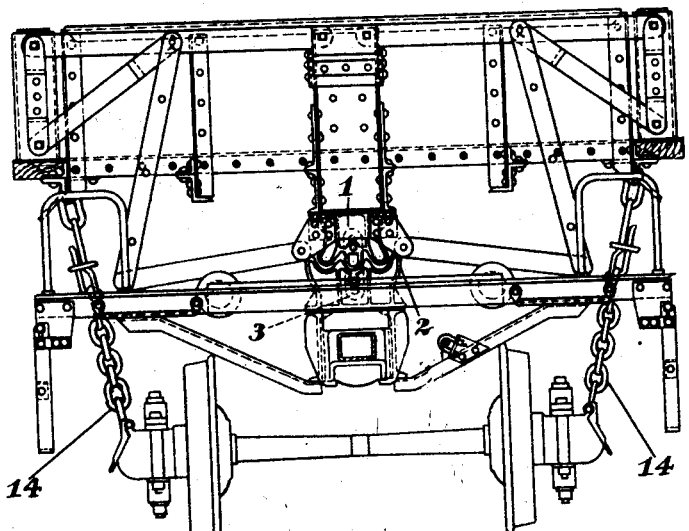
Figure 2:
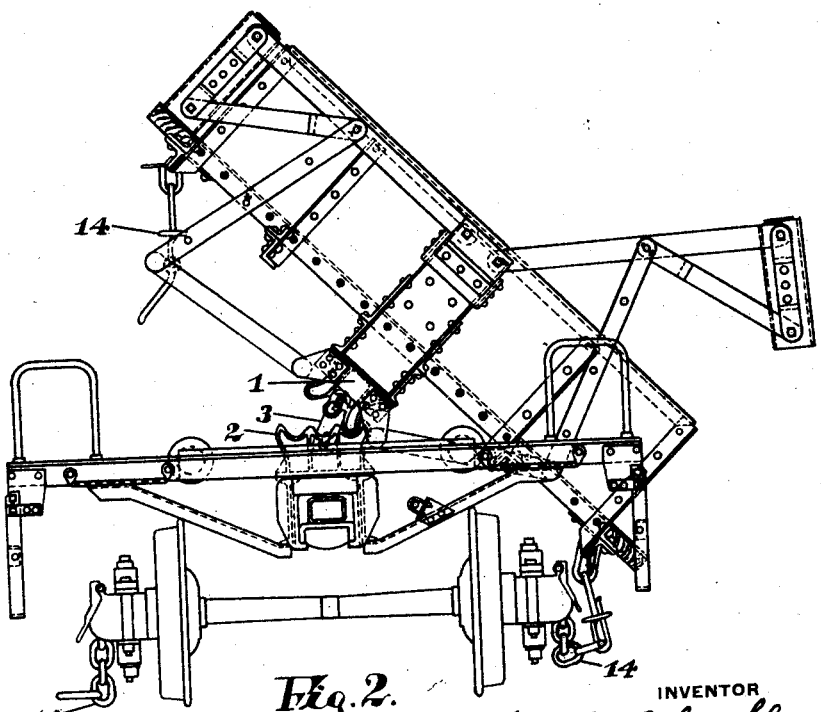
Figure 3:
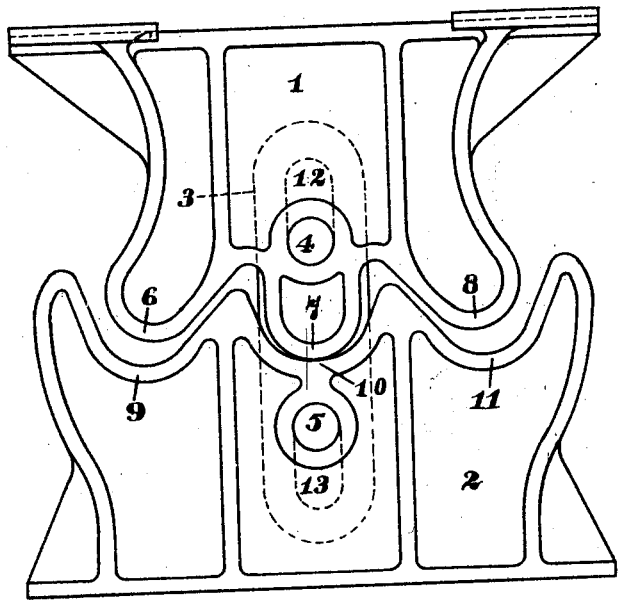
Figure 4:
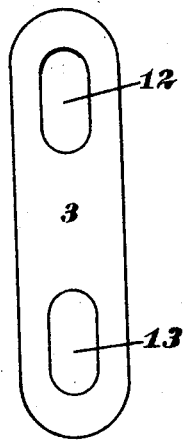
Figure 5:
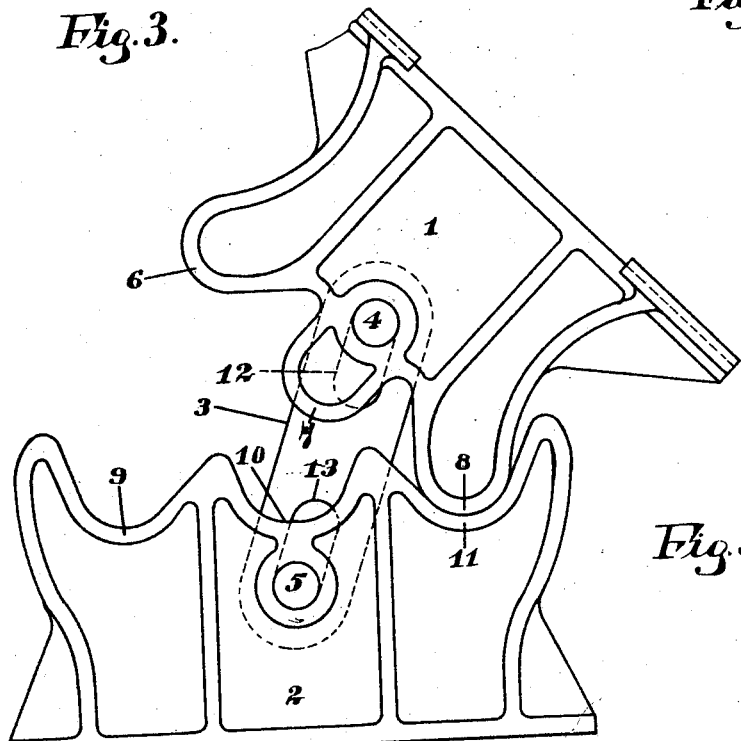

Referring to the drawings, Fig. 1 is an end view of a dump car embodying the invention and shows the position of the body bearing when the body is in normal position; Fig. 2 is an end view of the same car and shows the position of the body and body bearing supports when the car is in a discharging position; Fig. 3 is an enlarged view and shows the body bearing support when in a normal position; Fig. 4 shows the connecting link and Fig. 5 is an enlarged detail showing the body bearing support and the position of the locking link when the body is in a discharging position.

Referring now in detail to the drawings, the reference character 1 indicates the three winged movable member of the body bearings secured to the underside of the car body at spaced intervals, throughout the length of the car. The three winged portions of the body member 1 are spaced one at the transverse center line of the body and one on either side thereof and are suitably braced. These winged portions 6, 7 and 8 bear in suitably disposed sockets 9, 10, 11 in a base member 2 secured to the car underframe. When the car is in transit the wing pivot 7 bearing in its socket 10 of the base member 2 supports the car body which is held in a horizontal position by chains 14 or other locking device fastened to the car body and extending to the car underframe. A link member 3 is retained in recessed portions of the members 1 and 2 by pins 4 and 5 to prevent separation during any carrying or dumping operation.

When the car is in position on the railroad tracks to discharge its contents, the safety chains are disconnected and the car body is tilted. As soon as the body begins to tilt the eccentric wing pivot on the tilting side engages, contacting with its socket and becomes the fulcrum point, thus lifting the central wing pivot from its socket, permitting an abrupt and rapid tilting of the car body.

This rapid tilting of the body aided by the weight of the material being discharged may cause the body to leave the underframe unless restrained by some additional means. The link 3 during the dumping operation is carried upward by the pin 4 passing through the slot 12 until the required dumping angle is reached, when the pin 5 in the lower member contacting with the slot 13 locks the members 1 and 2 against further rotation. This position is shown in Fig. 5.

The body will remain in dumping position, as shown in Fig. 5, until manually returned. This return of the car body is aided materially by the eccentricity of the fulcrum point during the early part of the return movement. This is accomplished by a large part of the weight of the body being to the rear of the fulcrum point and in the direction of the return rotation.

From the foregoing description and an inspection of the drawings, the advantages of this type of bearing can readily be seen. Three desirable features of a dump car are stability during the transportation of the material to the dumping point, a steep discharge angle to facilitate the removal of the material from the car body, and the discharging of the material beyond the car tracks. Prior to our invention, dump cars of the center hinge type had to raise the body above the car trucks with a consequent loss of stability in order to obtain the same steepness of discharge angle and distance of ultimate discharge away from the car tracks as is obtained by our construction. By the use of our invention the body is placed close to the trucks, and by making the bearings for the three-wing pivots of the upper half of the bearing on the same horizontal plane an eccentric tilting action is obtained. This allows the rising side of the body to move a greater distance than the descending side, giving a steeper discharge angle without striking the car trucks than was heretofore possible.

Having thus described the invention what we claim as new and desire to secure by Letters Patent is:—

1. In a dump car, body tilting bearings having central and eccentric bearing surfaces supporting a car body, independent pivots on an upper member, for each dumping or carrying position, bearing in suitably disposed coplanar sockets of a supporting member.

2. In a dump car, body tilting bearings comprising a movable member having a plurality of pivots thereon, namely, a central supporting pivot and eccentric pivots on each side thereof, a base member with corresponding bearing sockets all of which are on the same horizontal plane, locking means against separation of said members, and a dump body supported on the first of the aforesaid members and adapted to tilt to either side thereof to discharge its contents.

3. In a dump car, body tilting bearings comprising a movable member having pivots thereon supported in a base member having corresponding bearing sockets whose bases are on the same horizontal plane, a slotted link connecting said movable and base members to prevent separation thereof in any operative position.

4. In a dump car, body tilting bearings comprising a movable member having pivots thereon supported in a base member having corresponding bearing sockets, the bases of which are on the same horizontal plane, a slotted link member contained in recessed portions of said bearing members, co-operating with pins in each of said members to prevent separation of said members in any operative position.

5. In a dump car, body tilting bearings comprising a tilting body carrying member and a base member with a locking link contained in recessed portions of said members, eccentric pivots on the tilting member of said bearings, pivoting in the same horizontal plane as the central pivot to shift the bearing point of car body off the gravitational center line during the dumping operation, thus facilitating the return of the car body to a horizontal position.

6. The combination in a dump car of two piece body hinge bearings locked together against separation during any dumping operation by a link member, central and eccentric pivots on one of said members pivoting on the other of said members in suitable sockets all on one horizontal plane, either eccentric pivot on contacting with its socket, during the dumping operation, lifts the other pivots out of contact with their bearing sockets and shifts the fulcrum point of the car body to a point off center to discharge the contents of the car away from the tracks.

In testimony whereof, we affix our signatures.

ALFRED C. SCHMOHL.
JOHN P. ANDERSON.